(12) United States Patent
Querubin

(10) Patent No.: US 7,758,711 B1
(45) Date of Patent: Jul. 20, 2010

(54) METHOD OF FORMING A PLANTER

(76) Inventor: Rock N. Querubin, 2020 W. Temple St., Los Angeles, CA (US) 90026

( * ) Notice: Subject to any disclaimer, the term of this patent is extended or adjusted under 35 U.S.C. 154(b) by 853 days.

(21) Appl. No.: 11/607,937

(22) Filed: Dec. 4, 2006

(51) Int. Cl.
  *B09B 3/00* (2006.01)
  *A01G 9/02* (2006.01)
(52) U.S. Cl. .................... 156/95; 156/293; 47/65.7
(58) Field of Classification Search ............ 156/95, 156/126, 127, 293; 47/65.7
See application file for complete search history.

(56) References Cited

U.S. PATENT DOCUMENTS

| | | |
|---|---|---|
| 2,199,845 A | 5/1940 | Wolf |
| 3,038,512 A | 6/1962 | Staton |
| 3,472,715 A * | 10/1969 | Weinbrenner et al. ....... 156/125 |
| 3,621,611 A | 11/1971 | Wingerra |
| D243,941 S | 4/1977 | Koeppel |
| 5,015,315 A * | 5/1991 | Nakasaki ................. 156/130.7 |
| 5,050,342 A | 9/1991 | Figueroa |
| 5,267,662 A | 12/1993 | Hayes |
| 5,637,057 A * | 6/1997 | Collura ........................ 482/27 |
| 6,055,773 A | 5/2000 | Yang |

FOREIGN PATENT DOCUMENTS

| | | | |
|---|---|---|---|
| GB | 2393443 A | * | 2/2004 |
| JP | 06-315936 A | * | 11/1994 |

* cited by examiner

*Primary Examiner*—Geoffrey L Knable

(57) ABSTRACT

A method of forming a planter includes providing a first tire portion and a second tire portion each including an outer wall and a peripheral wall of a tire. The outer walls each have an aperture therein bounded by a perimeter edge. The peripheral walls of the first and second tire portions have a free edge positioned opposite of the outer wall. The first and second tire portions are each inverted so that an inner side of each of the peripheral walls of the first and second tire portions is directed outwardly. The free edge of the first tire portion is positioned within an opening defined by the free edge of the second tire portion. The peripheral wall of the second tire portion extends around and is coextensive with free edge of the first tire portion to form a planter.

5 Claims, 2 Drawing Sheets

METHOD OF FORMING A PLANTER

BACKGROUND OF THE INVENTION

1. Field of the Invention

The present invention relates to planter devices and more particularly pertains to a new planter device for holding soil into which one or more plants may be potted.

2. Description of the Prior Art

The use of planter devices is known in the prior art. While these devices fulfill their respective, particular objectives and requirements, the need remains for a method of making a planter that utilizes recycled tires. This will provide planters that are durable to last for the life of a plant or tree. Further, planters made of recycled tire parts will form a relatively large planter capable of holding very large plants, shrubs and also trees such as, but not limited to, palm trees.

SUMMARY OF THE INVENTION

The present invention meets the needs presented above by generally providing a first tire portion and a second tire portion each including an outer wall and a peripheral wall of a tire. The outer walls each have an aperture therein bounded by a perimeter edge. The peripheral walls of the first and second tire portions have a free edge positioned opposite of the outer wall. The first and second tire portions are each inverted so that an inner side of each of the peripheral walls of the first and second tire portions is directed outwardly. The free edge of the first tire portion is positioned within an opening defined by the free edge of the second tire portion. The peripheral wall of the second tire portion extends around and is coextensive with free edge of the first tire portion to form a planter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
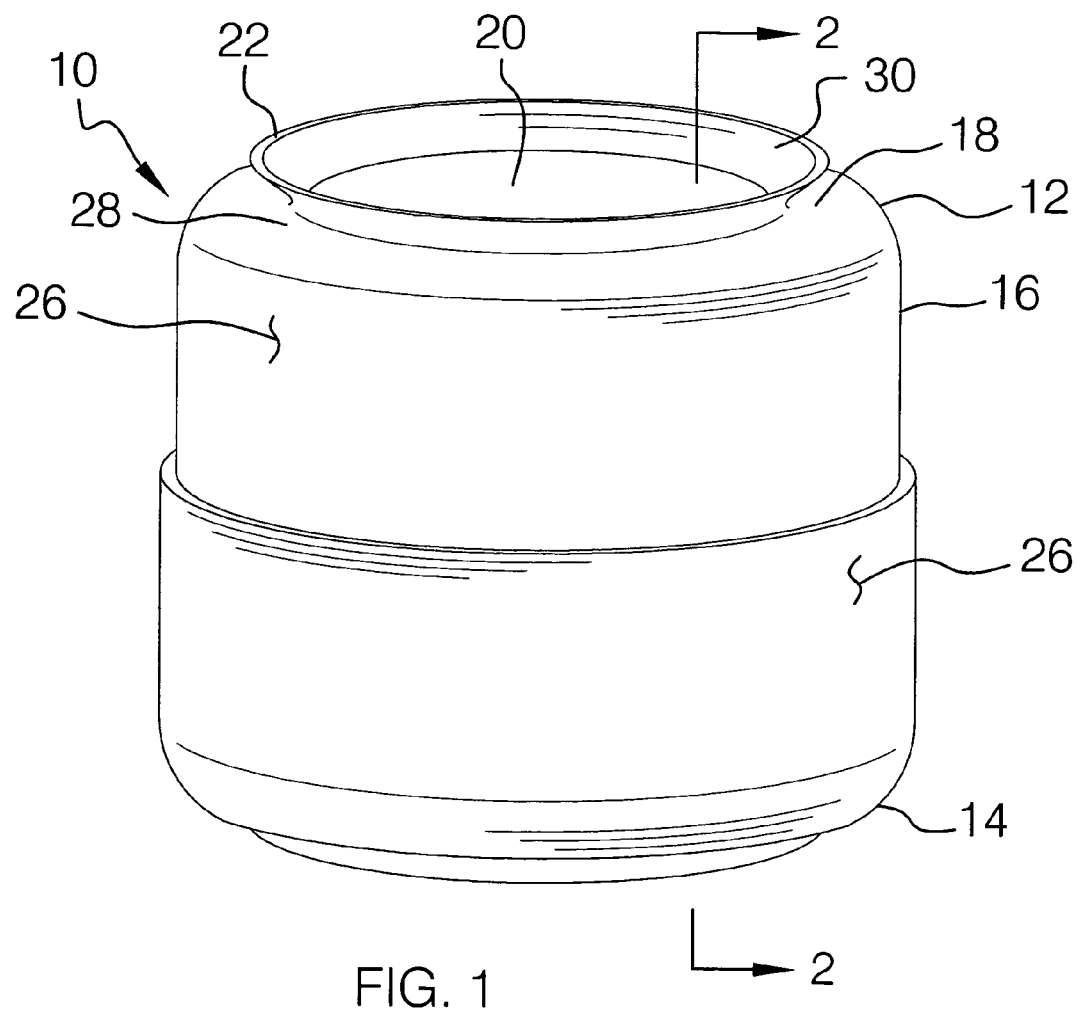
FIG. 1 is a front perspective view of a method of forming a planter according to the present invention.
Figure 2:
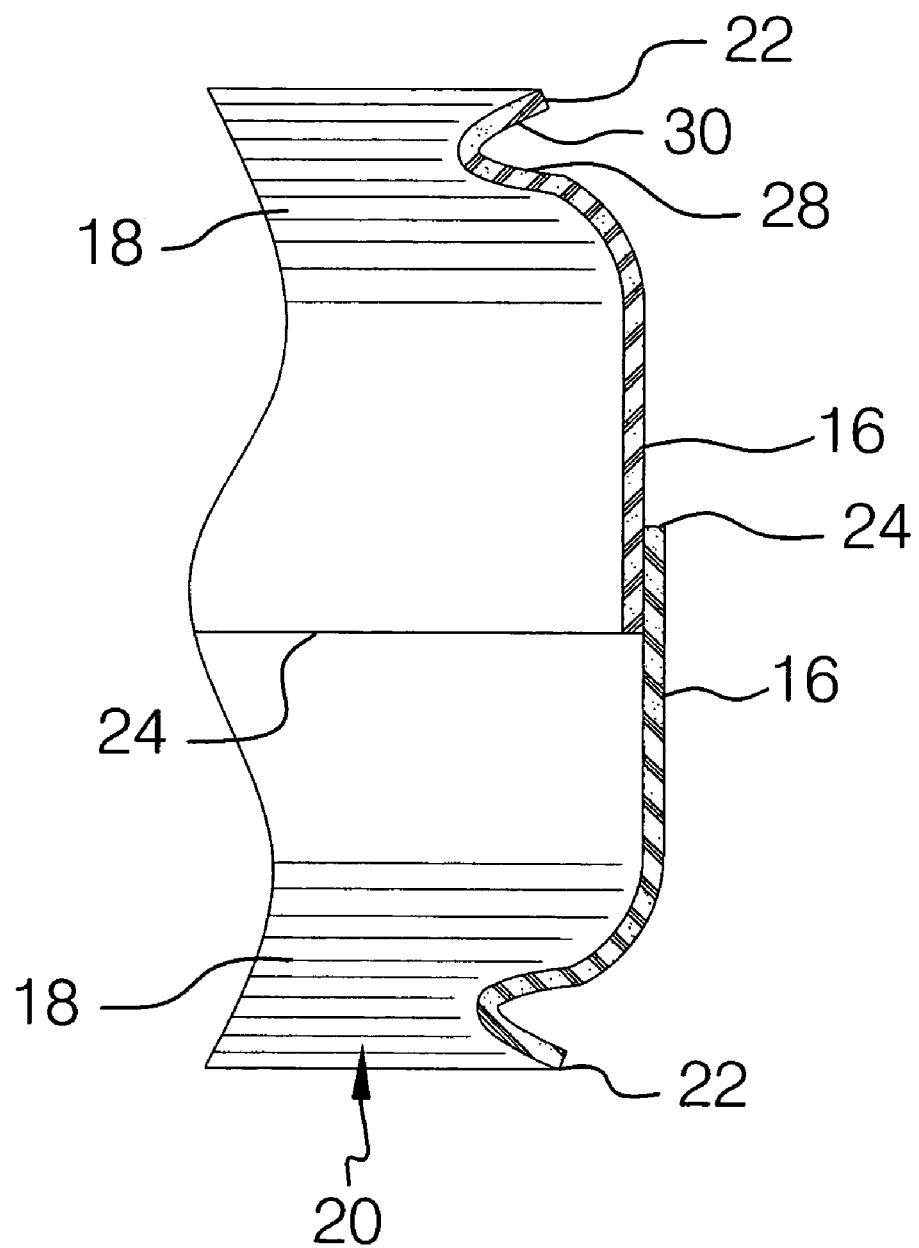
FIG. 2 is a cross-sectional view taken along line 2-2 of FIG. 1 of the present invention.

With reference now to the drawings, and in particular to FIGS. 1 and 2 thereof, a new planter device embodying the principles and concepts of the present invention and generally designated by the reference numeral 10 will be described.

As best illustrated in FIGS. 1 and 2, the method of forming a planter 10 generally comprises providing a first tire portion 12 and a second tire portion 14. Each of the first 12 and second 14 tire portions comprise an tread portion 16 and a side wall portion 18 that is removed from a whole tire, not shown, which would include both tread and side wall portions. The side wall portions of the first 12 and second 14 tire portions each have an aperture 20 therein bounded by a perimeter edge 22. The tread portions 16 of the first 12 and second 14 tire portions each have a free edge 24 positioned opposite of the side wall portions 18.

The first 12 and second 16 tire portions are inverted so that an inner side 26 of each of the tread portions of the first 12 and second 14 tire portions is directed outwardly. A portion of the side wall portions 18 of each of the first 12 and second 14 tire portions are folded outwardly so that an inner portion 28 of the side wall portions 18 with respect to a corresponding one of the tread portions 16 faces inwardly and an outer portion 30 of the side wall portions 18 with respect to a corresponding one of the perimeter edges 22 faces outwardly. The outer portions 30 define a lip extending over the inner portions 28 of the side wall portions 18.

The free edge 24 of the first tire portion 12 is positioned within an opening defined by the free edge 24 of the second tire portion 14. The tread portion 16 of the second tire portion 14 extends around and is coextensive with free edge 24 of the first tire portion 12. The first 12 and second 14 portions are bonded together, either with an adhesive or with heat to define the planter 10.

In use, after the planter 10 has been constructed, it may be filled with soil and plants, trees, shrubs and the like may be planted in the soil.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for making a planter comprising the steps of:
   providing a first tire portion, said first tire portion comprising a tread portion and a side wall portion of a tire, said side wall portion of said first tire portion having an aperture therein bounded by a perimeter edge, said tread portion of said first tire portion having a free edge positioned opposite of said side wall portion;
   providing a second tire portion, said second tire portion comprising a tread portion and a side wall portion of a tire, said side wall portion of said second tire portion having an aperture therein bounded by a perimeter edge, said tread portion of said second tire portion having a free edge positioned opposite of said side wall portion;
   inverting said first and second tire portions such that an inner side of said tread portion and side wall portion of said first and second tire portions are directed outwardly; and
   positioning said free edge of said first tire portion within an opening defined by said free edge of said second tire portion, said tread portion of said second tire portion extending around and being coextensive with said free edge of said first tire portion, said tread portion of said second tire portion extending over and abutting said tread portion of said first tire portion while leaving the sidewall of the first tire portion spaced from and outside the second tire portion.

2. The method according to claim 1, further including the step of folding outwardly a portion of said side wall portion of each of said first and second tire portions so that an inner portion of said side wall portions with respect to a corresponding one of said tread portions faces inwardly and an outer portion of said side wall portions with respect to a corresponding one of said perimeter edges faces outwardly, said outer portions defining a lip extending over said inner portions of said side wall portions.

3. The method according to claim 1, further including the step of folding outwardly a portion of said side wall portion of said first tire portion so that an inner portion of said side wall portion with respect to said tread portion faces inwardly and an outer portion of said side wall portion with respect to said perimeter edge faces outwardly, said outer portion of said first tire portion defining a lip extending over said inner portions of said side wall portion.

4. The method according to claim 1, further including the step of bonding said first and second tire portions together.

5. The method according to claim 2, further including the step of bonding said first and second tire portions together.

* * * * *